June 19, 1934.  G. C. HUME  1,963,202
DEVICE FOR APPLYING AND REMOVING LOCKING BUNGS
Filed June 28, 1933
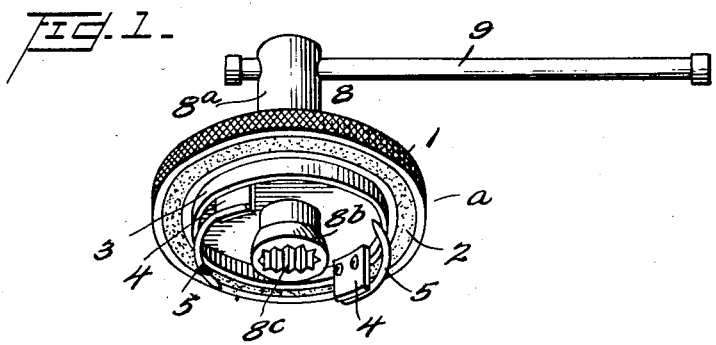
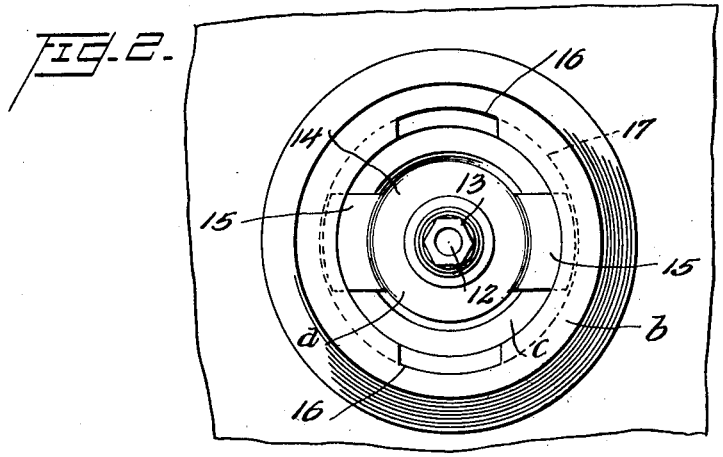
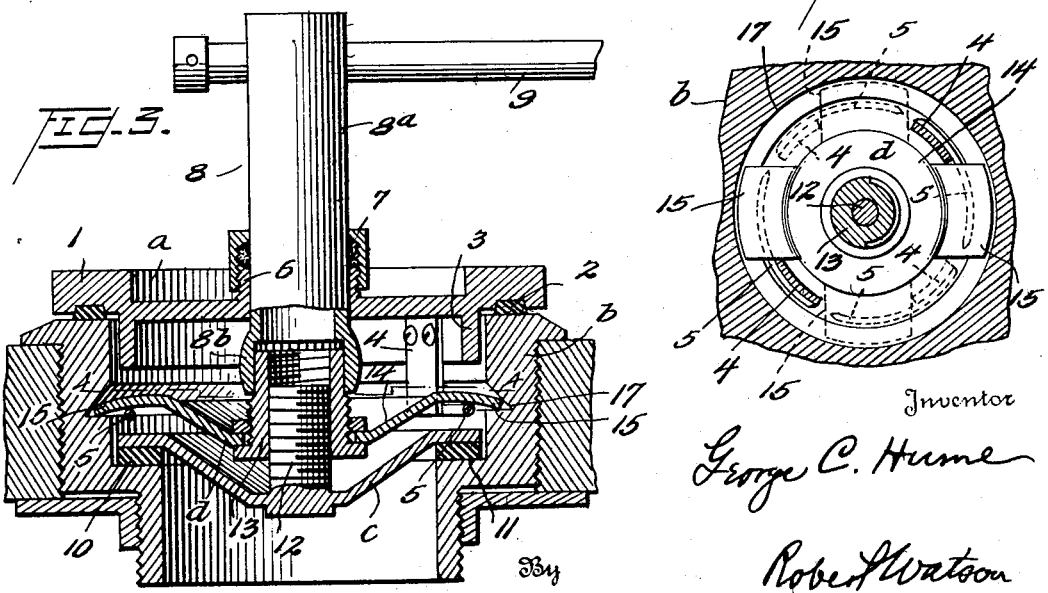
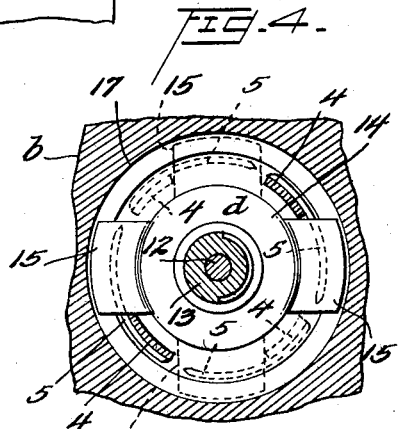
Inventor
George C. Hume
By Robert H. Watson
Attorney Patented June 19, 1934

1,963,202

UNITED STATES PATENT OFFICE 1,963,202

DEVICE FOR APPLYING AND REMOVING LOCKING BUNGS

George C. Hume, Chilton, Wis.

Application June 28, 1933, Serial No. 678,070

3 Claims. (Cl. 217—112)

This invention relates to a device for applying and removing locking bungs from bung-bushings and it is adapted more particularly for use in connection with a locking bung of the type in the copending application of John Thompson, Serial Number 668,839, filed May 1, 1933.

In the accompanying drawing,

Fig. 1 is a perspective view of the bung-applying device;

Fig. 2 is a top plan view of a bung-bushing and locking bung of the type for which the device is adapted;

Fig. 3 is a central section through the bung, bung-bushing and bung-applying device, and, Fig. 4 is a section on the line 4—4 of Fig. 3.

Referring to the drawing and particularly to Figs. 1 and 3, the bung-applying device a comprises a metal disc 1 having near its periphery an inset packing ring 2 adapted to fit against the end of a bung-bushing b and having a flange 3 adapted to fit within the bushing to center the device with respect to the bushing and bung. Depending from the flange, at diametrically opposite points, are short metal strips 4 which support hooks 5 arranged concentrically with the flange 3 and which are spaced from the flange by the supports. The disc 1 has a central opening surrounded by an upright threaded flange 6 and a packing ring 7 threaded onto this flange encloses a suitable packing and forms a stuffing box through which the shank 8ª of a wrench 8 extends. The wrench has a head 8ᵇ provided with a plurality of internal angular recesses 8ᶜ adapted to engage a sleeve nut associated with the bung-locking device. The wrench also has a suitable handle 9 connected with the shank for turning the latter. The bung and bung-locking device shown in the drawing are the same as that illustrated in the aforesaid Thompson application. As shown, the bung c comprises a disc adapted to rest upon a packing ring 10, on a shoulder 11 on the interior of the bushing and this bung has at its center an upwardly projecting stud 12, having a left-hand thread. The stud is engaged by a sleeve nut 13 on which is swiveled a locking device d. This locking device consists of a disc 14 of smaller diameter than the bung and having oppositely extending parts 15 adapted to pass through notches or recesses 16 formed in the inner wall of the bung-bushing and extending from its outer end to an annular recess 17 in said wall which is spaced a short distance from the shoulder 11. When the bung and locking member, connected by the threaded stud, are passed into the bushing and the locking member is given a partial turn, to move the extensions 15 out of alinement with slots 16 and the sleeve nut is then turned to the right, the bung becomes locked within the bushing, compressing the packing ring 10 to form a seal.

In using the device to lock a bung, the bung and locking member, connected together by the stud and sleeve nut, are appended to the bung-applying device by inserting the sleeve nut in the socket of the wrench and turning the locking member so that its ends pass between the hooks 5 and flange 3 and against the supports 4. The device is then lowered over the bung-bushing, the extensions of the locking device passing through the slots 16 in the bushing and the disc 1, with its packing ring 2, then rests upon the top of the bushing, as shown in Fig. 3. The locking device and the supports 4 and hooks 5 are then in the positions shown in dotted lines, in Fig. 4. The disc 1 is then turned to the right and the supports 4 serve as shoulders to push the locking member into the full-line position, in Fig. 4. The wrench is then turned in the clock-wise direction, causing the sleeve nut and stud to force the bung and locking member in opposite directions, thereby causing the bung to compress the packing ring 10 to form a sealed joint between the bung and the bushing.

It is to be noted that the application of the bung can be quickly made by this device and that while the locking and tightening operations are proceeding, the outer end of the bushing will be closed by the disc 1, thus preventing the escape of liquid and gas.

When it is desired to remove the bung, the device can be applied to it and by turning the wrench in the counter-clock-wise direction, the tension on the locking member will be relieved and then by turning the disc 1 in the clock-wise direction, the supports 4 and attached hooks can be moved from the dotted-line position to the full-line position, in Fig. 4, wherein the hooks underlie the extensions 15 of the locking member and a further movement will cause the supports to turn the locking member so that these extensions will be in alinement with the slots 16, when the device may be lifted away from the bushing and the bung and locking member, supported by the hooks, will be withdrawn from the bushing.

What I claim is:

1. A bung-applying device for bungs of the type described in which there is a swiveled locking member and a nut for tightening said member, said device comprising a disc adapted to fit over and close the bung-bushing, a shoulder on said disc adapted to engage and turn the locking member when the disc is turned, and a wrench having a shank journaled centrally in the disc and having a head adapted to engage the nut.

2. A bung-applying device for bungs of the type described in which there is a swiveled locking member and a nut for tightening said member, said device comprising a disc adapted to fit over and close the bung-bushing, diametrically opposite shoulders on said disc adapted to engage and turn the locking member when the disc is turned, hook members adapted to extend between the bung and locking member, and a wrench having a shank journaled centrally in the disc and having a head adapted to engage the nut.

3. A bung-applying device for bungs of the type described in which there is a swiveled locking member and a nut for tightening said member, said device comprising a disc adapted to fit over and close the bung-bushing, a flange on the disc adapted to extend within the bushing to center the disc thereon, diametrically opposite shoulders projecting below said flange and adapted to engage and turn the locking member when the disc is turned, curved hook members connected to said shoulders and extending substantially concentric with the axis of the disc, a stuffing box at the center of the disc and a wrench having a shank extending through the stuffing box and having a head adapted to engage the nut.

GEORGE C. HUME.